Figure 1:
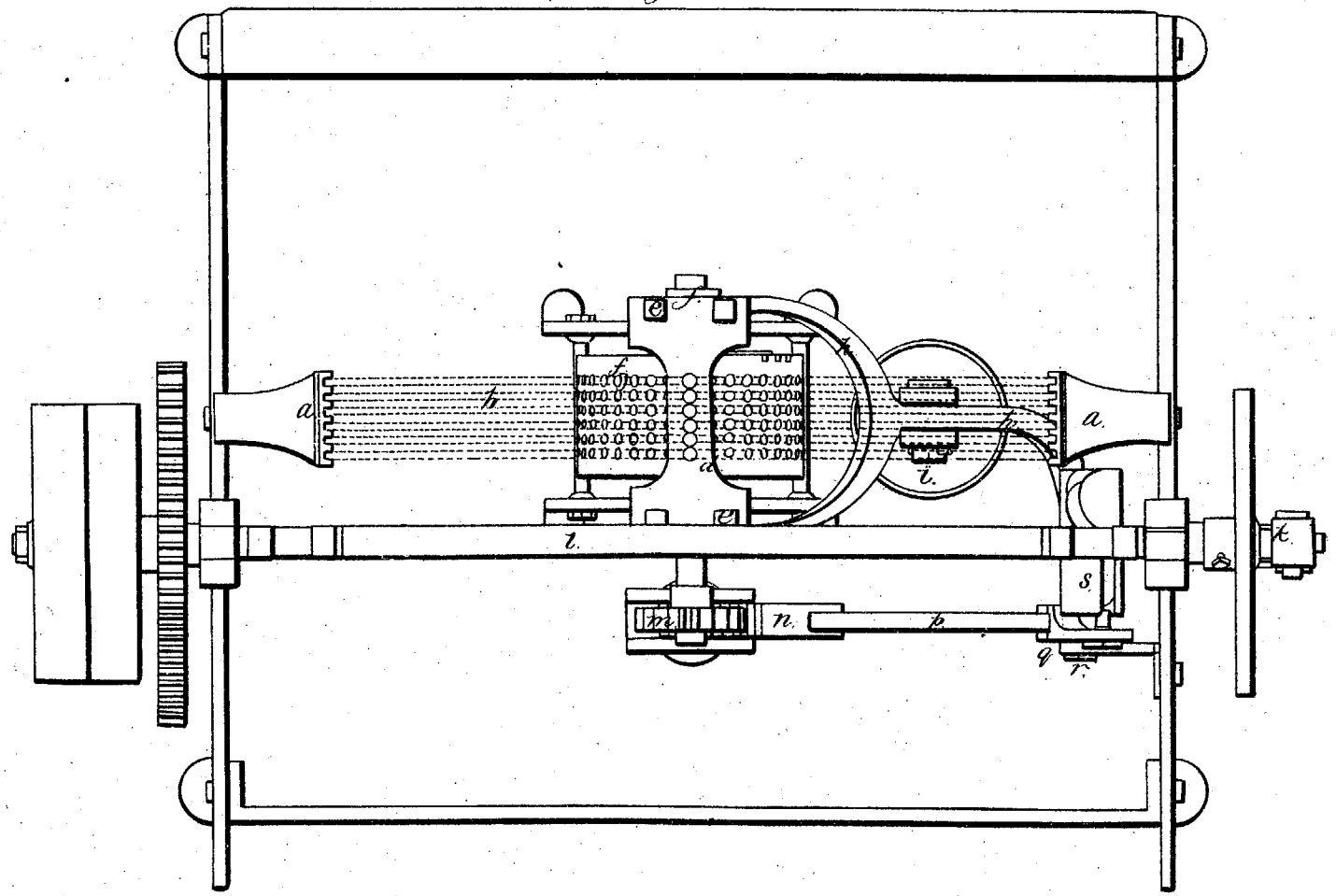

No. 320. REISSUED JULY 24, 1855.

R. GARSED.

LOOM FOR WEAVING FIGURED FABRICS.

3 SHEETS—SHEET 1.

No. 320. REISSUED JULY 24, 1855.
R. GARSED.
LOOM FOR WEAVING FIGURED FABRICS.
3 SHEETS—SHEET 2.
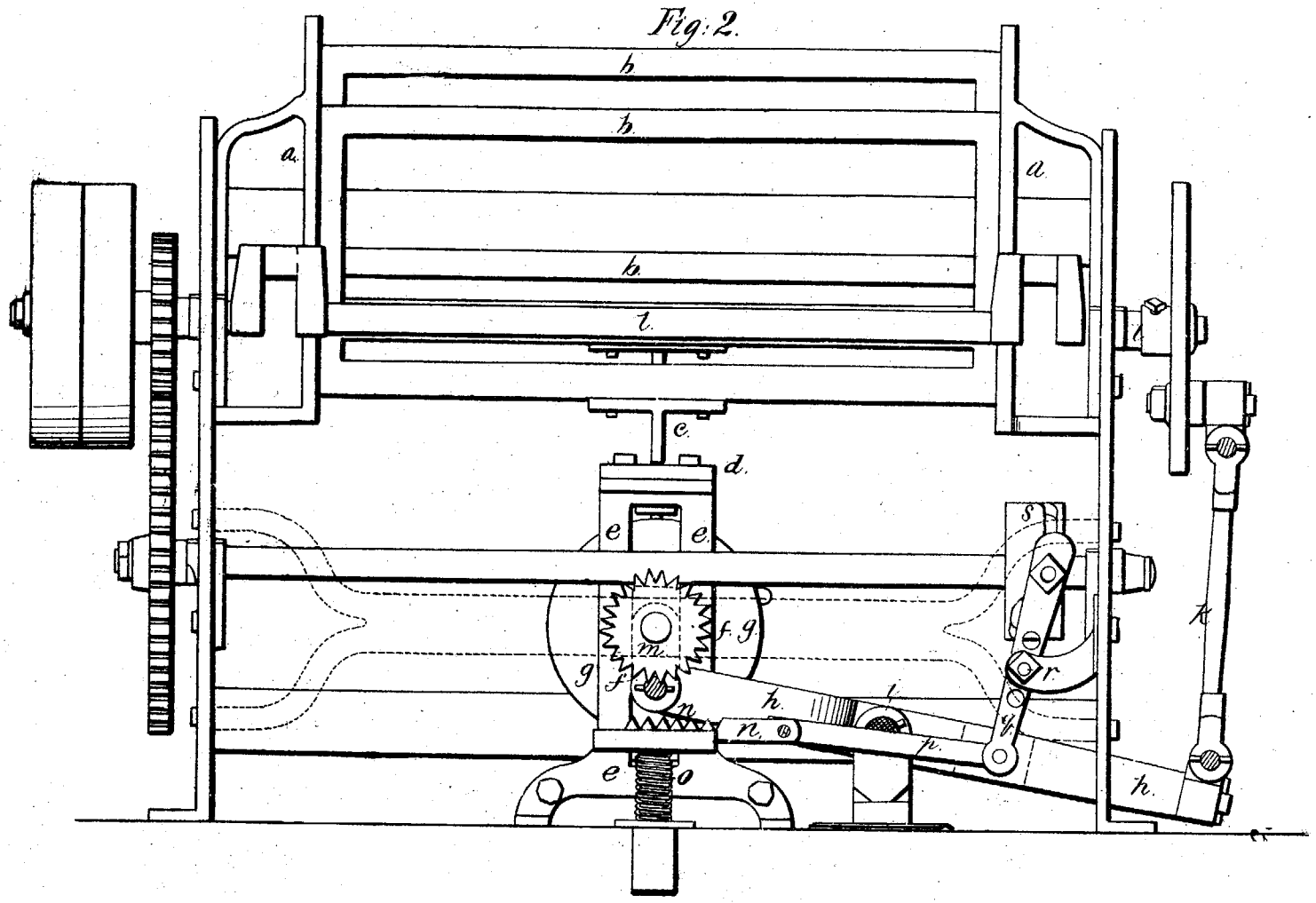

No. 320. REISSUED JULY 24, 1855.
R. GARSED.
LOOM FOR WEAVING FIGURED FABRICS.
3 SHEETS—SHEET 3.
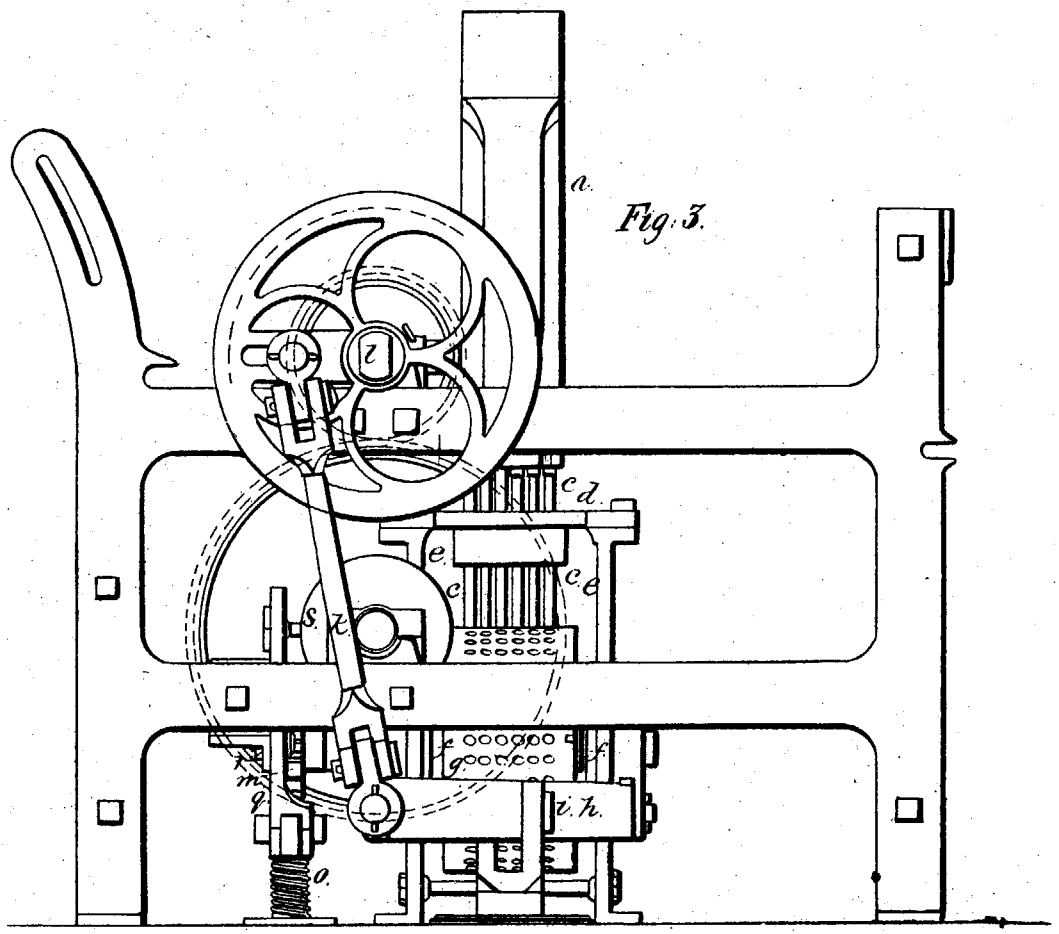

UNITED STATES PATENT OFFICE.

RICHARD GARSED, OF FRANKFORD, PENNSYLVANIA.

IMPROVEMENT IN LOOMS FOR WEAVING FIGURED FABRICS.

Specification forming part of Letters Patent No. 6,845, dated November 6, 1849; Reissue No. 320, dated July 24, 1855.

*To all whom it may concern:*

Be it known that I, RICHARD GARSED, of Frankford, in the county of Philadelphia and State of Pennsylvania, have invented certain new and useful Improvements in Working the Patterns in Power-Looms; and I do hereby declare the following to be a full, clear, and exact description thereof, reference being had to the accompanying drawings, in which—

Figure 1 is a top plan. Fig. 2 is a rear elevation. Fig. 3 is a side elevation.

My improvement consists of a combination of two or more patterns which can at intervals be brought into action to work the heddles of the loom by shifting from one pattern to another, so that by changing either pattern can be brought into action without removing any one of said patterns from the loom and substituting another in its place, which would cause great delay if the changes were frequent.

Many attempts have been made to work heddles by a jacquard or its equivalent, but they all involve a complicated combination of parts, and have been limited in their powers to vary the pattern, and which could not be entirely changed without great delay in stopping the loom and substituting new parts for those first used.

I am aware that a jacquard has been placed under a series of needles for working a pattern directly from it, but this weaved one pattern for a long distance and then changed to a different pattern, and required cards or chairs of very great length, making it oftentimes inapplicable to power-looms and not available practically for the same purposes as my improvement.

In my improvement there always exists in the same loom two or more patterns interchangeable at pleasure, and I thus obviate all the above-named difficulties and obtain a permanent and direct pattern-action which is simple in its parts, is not liable to derangement, can be readily changed, and is perfectly adapted to power-looms, by which I am enabled to weave several fabrics that could not be done on ordinary looms—such, for instance, as bags without seam, which I can weave whole by changing the pattern at each length of a bag, by weaving alternately double cloth, either twilled or plain, and uniting the cloths so as to form the bottom of the bag.

The construction of my apparatus in one form is as follows: The loom may be in all particulars of any ordinary pattern suited to the purpose, except in the parts hereinafter named. To the side of the frame I attach two guides, *a*, having vertical parallel grooves in them, in which the heddles slide up and down. The heddles *b* are oblong rectangular frames of wood or metal, to the lower bar of each of which a stem, *c*, is attached, which projects downward through a stationary guide, *d*, the lower end being just over a cylinder to be hereinafter described. Below the heddles there is a frame, *e*, affixed to the floor, in which are sliding boxes *f*, that receive the journals of a cylinder, *g*, in the periphery of which are regular series of parallel indentations, a portion of which are drilled through the exterior of the cylinder according to the pattern to be woven—a matter well understood by all practical figured power-loom weavers. The boxes or bearings *f* are supported on the end of a bifurcated lever, *h*, the fulcrum of which is at *i*. The opposite end of this lever is attached by a connecting-rod, *k*, with a crank on the main or crank shaft *l*, so that at each revolution of said shaft the cylinder is made to rise and fall, and as it rises it carries up all the heddles, except where the holes are drilled through, so as to permit the stems *c* to pass into the cylinder as it rises.

The cylinder is turned in the following ways to form the pattern: On the end of one of the journals of the cylinder there is a spur-wheel, *m*, the teeth of which are triangular or miter-formed. Below this wheel is a rack, *n*, with similar shaped teeth, the guide on which it is fixed being made to rise and fall by means of a spring, *o*. This rack is connected by a rod, *p*, with the lower end of a lever, *q*, having its fulcrum at *r*. The upper end of said lever carries a pin on it which works into a zigzag groove, *s*, on the face of a cylinder on the cam-shaft, so as to cause the rack to move back every time the wheel *m* descends far enough to mesh into it, and after the wheel *m* rises clear of the rack to return back to its former position.

By this arrangement the pattern-cylinder can be made to revolve any distance. To make it pass over one, two, or more series of holes, I simply change the fulcrum *r* of the lever *q*, by which means I can make any number of patterns (consistent with the size) upon the same cylinder. The cylinder is so made as to turn on its axis independent of the axis and of the wheel by which it is moved, and the cylinder is coupled with the axis by a catch, *t*, that enters notches on the cylinder, by which arrangement the cylinder can be shifted readily to any pattern without otherwise disturbing the arrangement of the loom.

It will be obvious to any practical weaver that I can modify this device in various modes without altering the nature of the invention. For example, by moving the zigzag cylinder *s* endways upon the shaft I can make the desired changes of the pattern instead of turning it upon its axis by means of the spring *t*.

Pins can be inserted in any of the holes in the cylinder if a great variety of patterns is wanted; but I prefer not to employ them generally. They are, however, a well-known device, and I do not claim them.

Having thus fully described my improvement, what I claim therein as new is—

1. Operating the heddle frames by the application of a cylinder having two or more patterns interchangeable at pleasure, in the manner and for the purpose substantially as hereinbefore set forth.

2. The employment of two or more distinct patterns simultaneously in the same loom, interchangeable at pleasure, operating in the manner and for the purpose hereinbefore described.

3. The apparatus for turning the cylinder, substantially as herein specified, whereby it can be moved through a greater or less space, as may be required.

Witnesses: RICHD. GARSED.

BARTON H. JENKS,

FRANCIS O'CONNOR.